(12) United States Patent
Hoppel

(10) Patent No.: US 10,058,030 B2
(45) Date of Patent: Aug. 28, 2018

(54) PORTABLE HYDRAULIC SYSTEM FOR SELECTIVE ENGAGEMENT TO A PIECE OF EQUIPMENT

(71) Applicant: GREEN INDUSTRY INNOVATORS, L.L.C., Louisville, OH (US)

(72) Inventor: Steffon L. Hoppel, Louisville, OH (US)

(73) Assignee: Green Industry Innovators, L.L.C., Louisville, OH (US)

( * ) Notice: Subject to any disclaimer, the term of this patent is extended or adjusted under 35 U.S.C. 154(b) by 27 days.

(21) Appl. No.: 15/459,262

(22) Filed: Mar. 15, 2017

(65) Prior Publication Data

US 2017/0265394 A1 Sep. 21, 2017

Related U.S. Application Data

(60) Provisional application No. 62/309,039, filed on Mar. 16, 2016.

(51) Int. Cl.
| | |
|---|---|
| *A01D 34/64* | (2006.01) |
| *A01D 69/00* | (2006.01) |
| *A01D 43/00* | (2006.01) |
| *F15B 1/04* | (2006.01) |
| *A01D 101/00* | (2006.01) |

(52) U.S. Cl.
CPC ......... *A01D 69/005* (2013.01); *A01D 34/64* (2013.01); *A01D 43/00* (2013.01); *F15B 1/04* (2013.01); *A01D 2101/00* (2013.01)

(58) Field of Classification Search
CPC ...... A01D 69/005; A01D 34/64; A01D 43/00; A01D 2101/00; F15B 1/04
See application file for complete search history.

(56) References Cited

U.S. PATENT DOCUMENTS

| | | | | |
|---|---|---|---|---|
| 3,200,592 | A * | 8/1965 | Nix | F15B 21/08 137/382.5 |
| 5,332,053 | A * | 7/1994 | Vachon | A01B 63/00 180/306 |
| 5,348,125 | A * | 9/1994 | Stribling | B30B 9/3042 100/229 A |
| 5,678,982 | A * | 10/1997 | Schwaiger | F15B 1/02 417/44.2 |
| 9,487,086 | B2 * | 11/2016 | Collett | B60K 25/06 |
| 2005/0274533 | A1 * | 12/2005 | Raimondo | A01B 59/068 172/439 |

(Continued)

*Primary Examiner* — Drew J Brown
(74) *Attorney, Agent, or Firm* — Sand & Sebolt

(57) ABSTRACT

A light-weight portable hydraulic system for engagement with equipment requiring hydraulic fluid to operate. The system includes a reservoir; a pump and an oil filter engaged with each other. One or more handles are provided on the system so that the system may be carried by a single individual or may be lifted onto or off of a supporting unit upon which the system is mountable. A suitable supporting unit may be a zero-turn stand-on mower. An input shaft for the pump is operatively engaged with the engine of the mower and the pump is powered by that engine. The system is selectively connected to the equipment requiring hydraulic fluid for operation, such as a mower attachment, by way of hydraulic hoses that quick connect to ports on the pump. The system may be engaged with or disengaged from the mower in around thirty seconds and without tools.

21 Claims, 13 Drawing Sheets

(56) References Cited

U.S. PATENT DOCUMENTS

| | | | |
|---|---|---|---|
| 2006/0180100 A1* | 8/2006 | Nikolai | F02B 63/04 123/1 R |
| 2009/0206612 A1* | 8/2009 | Baldassare | B60P 3/14 290/40 D |
| 2011/0173963 A1* | 7/2011 | Renner | B60P 3/14 60/327 |
| 2014/0167498 A1* | 6/2014 | Kowalski | B62D 55/32 305/15 |
| 2017/0181378 A1* | 6/2017 | Brown, Jr. | A01F 15/0841 |

* cited by examiner

PORTABLE HYDRAULIC SYSTEM FOR SELECTIVE ENGAGEMENT TO A PIECE OF EQUIPMENT

CROSS REFERENCE TO RELATED APPLICATIONS

This application claims the benefit of U.S. Provisional Application Ser. No. 62/309,039, filed on Mar. 16, 2016; the disclosure of which is incorporated herein by reference.

BACKGROUND

Technical Field

This invention relates generally to hydraulic systems. More particularly, this invention relates to hydraulic systems used to operate equipment on utility vehicles or mowers. Specifically, this invention is directed to a self-contained portable hydraulic system that may be readily attached to or detached from a piece of equipment such as a zero-turn stand-on mower to selectively provide hydraulic power to operate attachments engaged with the mower.

Background Information

Hydraulic systems have been utilized in a wide variety of applications for a number of years. One of those applications is the provision of power to components on equipment such as utility vehicles and mowers. Typically, these hydraulic systems are permanently mounted on the equipment's frame and form an integral part of the functional components of the equipment. In the case of mowers, by way of example, it has recently become more commonplace to selectively engage a variety of attachments to the mower to perform tasks other than cutting grass. For example, attachments such as rotating brushes or snowplow blades may be attached to the mower and operated to brush debris from surfaces or to clear snow. The attachments require connection to the mower's hydraulic system in order to function. The problem with this is that the mower's hydraulic system was designed to supply the needs of the original equipment provided on the mower. Consequently, engaging additional equipment to the mower that requires hydraulic connection may limit the type of attachments that a user will engage with his or her machine.

SUMMARY

The system disclosed herein is designed to address this supplemental need for hydraulic connection. A self-contained portable hydraulic system is disclosed herein which may be selectively mounted on a utility vehicle such as a mower or connected to any piece of equipment that requires hydraulic power. The portable hydraulic system is operable independent of the utility vehicle hydraulic system and includes hookups for operatively engaging the system to a variety of landscaping attachments. The portable hydraulic system may be operatively engaged with the vehicle's hydraulic system to boost the vehicle's hydraulic capacity, should that be desired.

The portable hydraulic system disclosed herein includes a reservoir for containing hydraulic fluid, a pump operatively engaged with the reservoir and having ports for connection of hydraulic hoses thereto; and an oil filter engaged with the reservoir and pump. The system does not include a motor or power supply but is, instead, configured so it may draw power from the engine of the piece of equipment onto which the portable system is mounted. The portable hydraulic system disclosed herein may be engaged and disengaged from the equipment in around thirty seconds and without the need for any tools. The portable hydraulic system is easily carried by a single individual because of its light weight and may be moved from one piece of equipment to another with ease.

While the portable hydraulic system is disclosed as being selectively engageable on a utility vehicle, such as a mower, it will be understood that this system may be used in a much wider variety of applications and could be shared with multiple platforms in multiple industries. It will further be understood that in some instances it may be desirable to also include a motor or power supply in the portable system to operate the pump. Modifying the disclosed portable hydraulic system to include this motor or power supply is considered to be within the scope of one of ordinary skill in the art.

In one aspect, the invention may provide a portable hydraulic system for selective engagement with a piece of equipment requiring hydraulic fluid flow; said portable hydraulic system comprising a reservoir adapted to store hydraulic fluid therein; a pump operatively engaged with the reservoir and adapted to selectively deliver a quantity of the hydraulic fluid from the reservoir to the piece of equipment when the piece of equipment is operatively engaged with the pump; a handle provided on one of the reservoir or the pump; and a mounting assembly provided on the reservoir or the pump; said mounting assembly being adapted to selectively mount the portable hydraulic system to a supporting unit or selectively dismount the portable hydraulic system from the supporting unit.

In another aspect, the invention may provide in combination, a utility vehicle, an attachment engaged with the utility vehicle, and a portable hydraulic system; wherein the portable hydraulic system is selectively mountable on the utility vehicle; wherein said portable hydraulic system is selectively fluidly engaged with the attachment; and wherein the attachment is selectively operated via the portable hydraulic system.

In another aspect, the invention may provide a method of operating an attachment on a utility vehicle; said method comprising the steps of providing a portable hydraulic system; mounting the portable hydraulic system on the utility vehicle; engaging the portable hydraulic system with an engine on the utility vehicle; connecting hydraulic hoses between the portable hydraulic system and the attachment; and actuating the portable hydraulic system to provide hydraulic fluid via the hydraulic hoses to the attachment.

BRIEF DESCRIPTION OF THE SEVERAL VIEWS OF THE DRAWINGS

A sample embodiment of the invention is set forth in the following description, is shown in the drawings and is particularly and distinctly pointed out and set forth in the appended claims.

Similar numbers refer to similar parts throughout the drawings.

DETAILED DESCRIPTION

Figure 1:
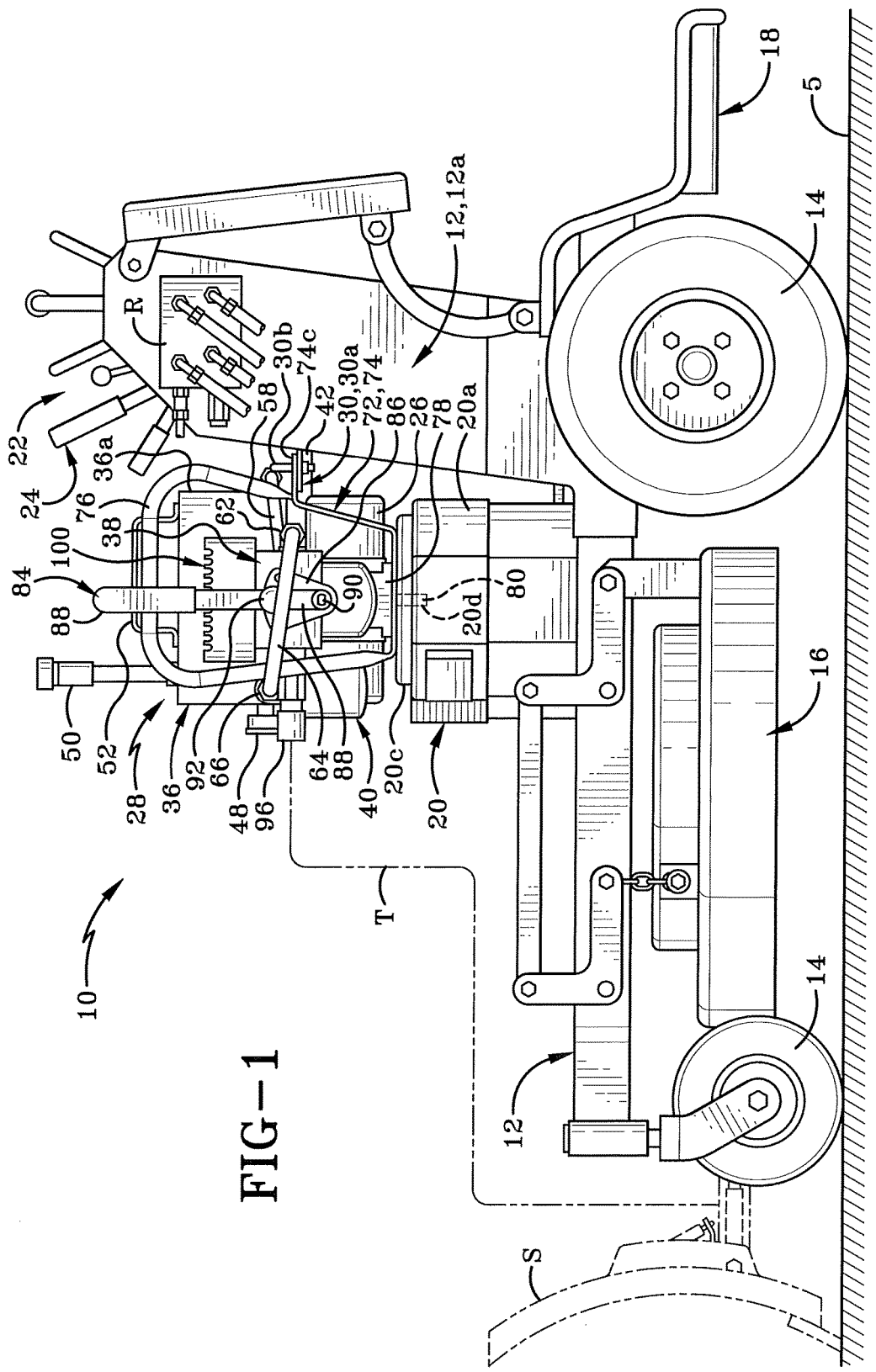
FIG. 1 is a left side view of a stand-on mower with the portable hydraulic system in accordance with an aspect of the invention mounted thereon.
Figure 2:
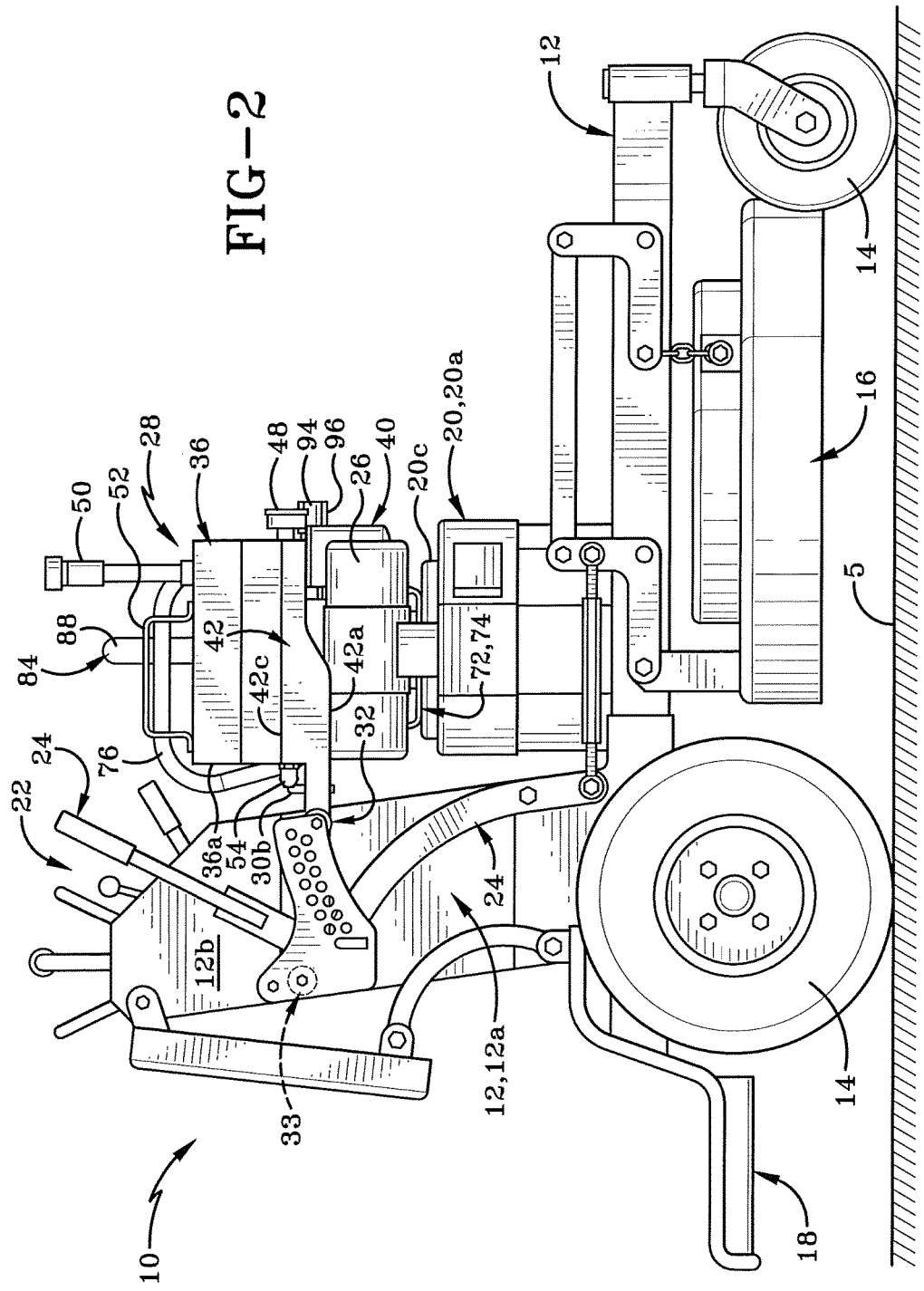
FIG. 2 is a right side view of the mower of FIG. 1.
Figure 3:
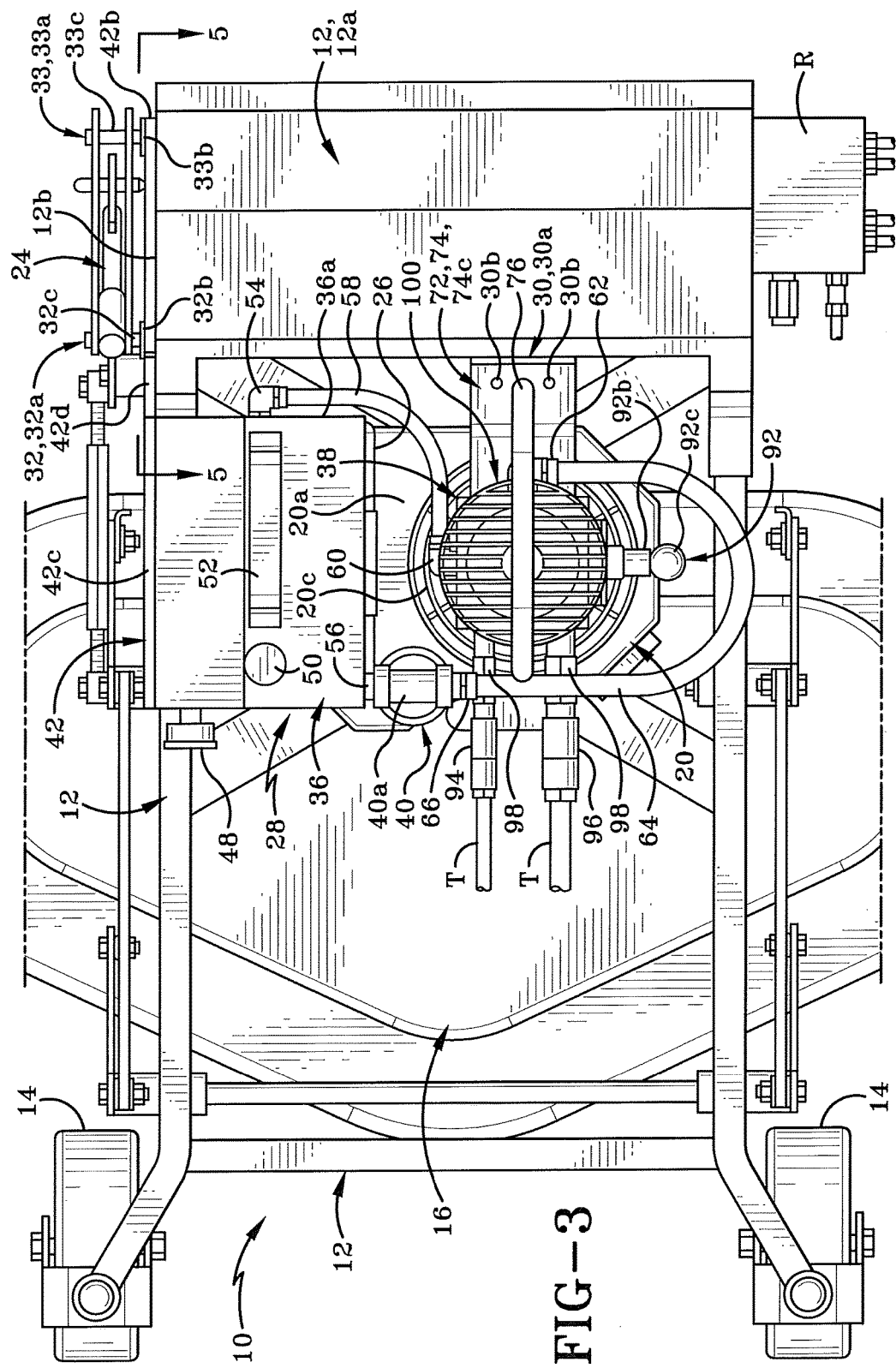
FIG. 3 is a partial top view of the mower and portable hydraulic system, the mower's control assembly, stand-on platform and rear wheels have been removed from the figure for clarity.

Referring to FIGS. 1-13, there is shown a utility vehicle, specifically a mower, generally indicated at 10. Mower 10 is an example of one type of a supporting unit upon which the portable hydraulic system of the present invention may be engaged. The term "mower" as used herein should be interpreted as being representative of any type or supporting unit upon which the portable hydraulic system may be mounted and engaged. Mower 10 may not only support the portable hydraulic system but the mower 10 may also provide the power needed to operate the portable hydraulic system. While engaged on mower 10, the portable hydraulic system is selectively secured to a piece of equipment, such as a mower attachment, that requires hydraulic power in order to be operated.

Mower 10 may be any type of mower but the type illustrated herein is a zero-turn stand-on mower. Mower 10 includes a frame, generally indicated at 12, a plurality of wheels 14 for moving mower 10 across a surface "S", a mower deck 16 hanging downwardly from frame 12 for cutting grass, and a stand-on platform 18 for supporting an operator. It will be understood that mower 10 may include a seat for the operator instead of platform 18 and be a sit-on mower. Mower 10 also includes an engine 20 and a control assembly 22 including controls for operating various components of mower 10. One of those controls is a control 24 for adjusting the height of the mower deck 16. An air filter 26 is also provided on mower 10. It will be understood that other components may be illustrated in the figures or may physically be provided on mower 10 but are not discussed herein.

Figure 13:
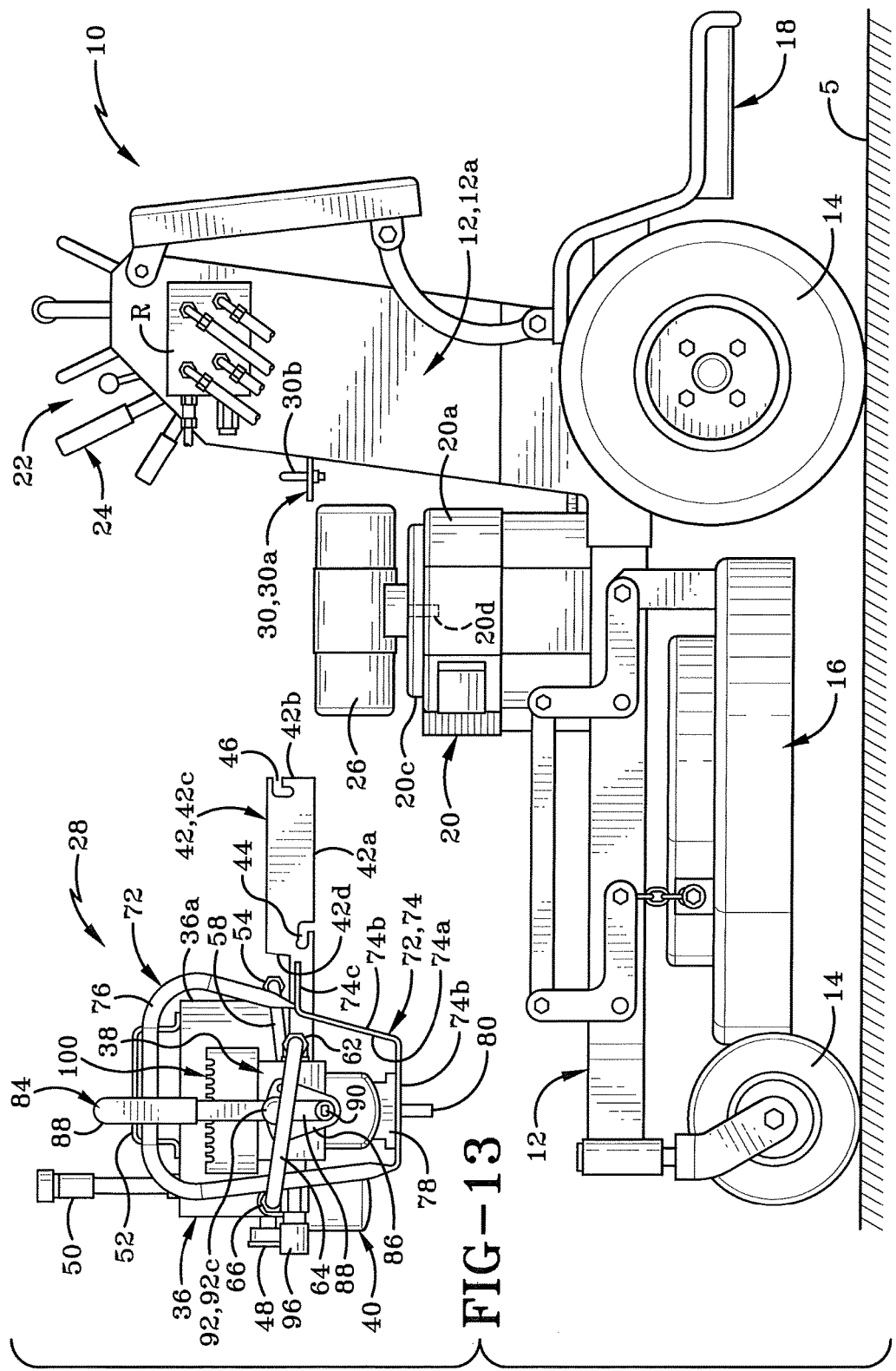
FIG. 13 is an exploded left side view of the mower showing the portable hydraulic system detached therefrom.

In accordance with an aspect of the present invention, a portable hydraulic system is selectively engageable with mower 10 to provide hydraulic connections and power for attachments that may be engaged with mower 10. The portable hydraulic system is generally indicated herein by the reference character 28 and is illustrated in detail in FIGS. 6-11. FIG. 1 shows portable hydraulic system 28 engaged with mower 10 and FIG. 13 shows hydraulic system 28 disengaged from mower 10.

Hydraulic system 28 is portable and independent of any hydraulic system "R" (FIG. 3) that may be provided on mower 10 in order to operate component parts of mower 10. Portable hydraulic system 28 is able to be installed on mower 10 in about thirty seconds and is able to be later removed from mower 10 in about thirty seconds. The installation of hydraulic system 28 on mower 10 and the subsequent removal therefrom is able to be accomplished without the use of any tools. Hydraulic system 28 is fully portable and, since it may weigh only around twenty-three pounds, hydraulic system 28 is easily carried by a single person or by more than one person if that is desired. Furthermore, hydraulic system 28 may be readily transferred from one mower to another, or transferred from mower 10 to another piece of equipment with relative ease. It is therefore possible for a single portable hydraulic system 28 to be used interchangeably on a number of different mowers or other pieces of equipment.

Figure 4:
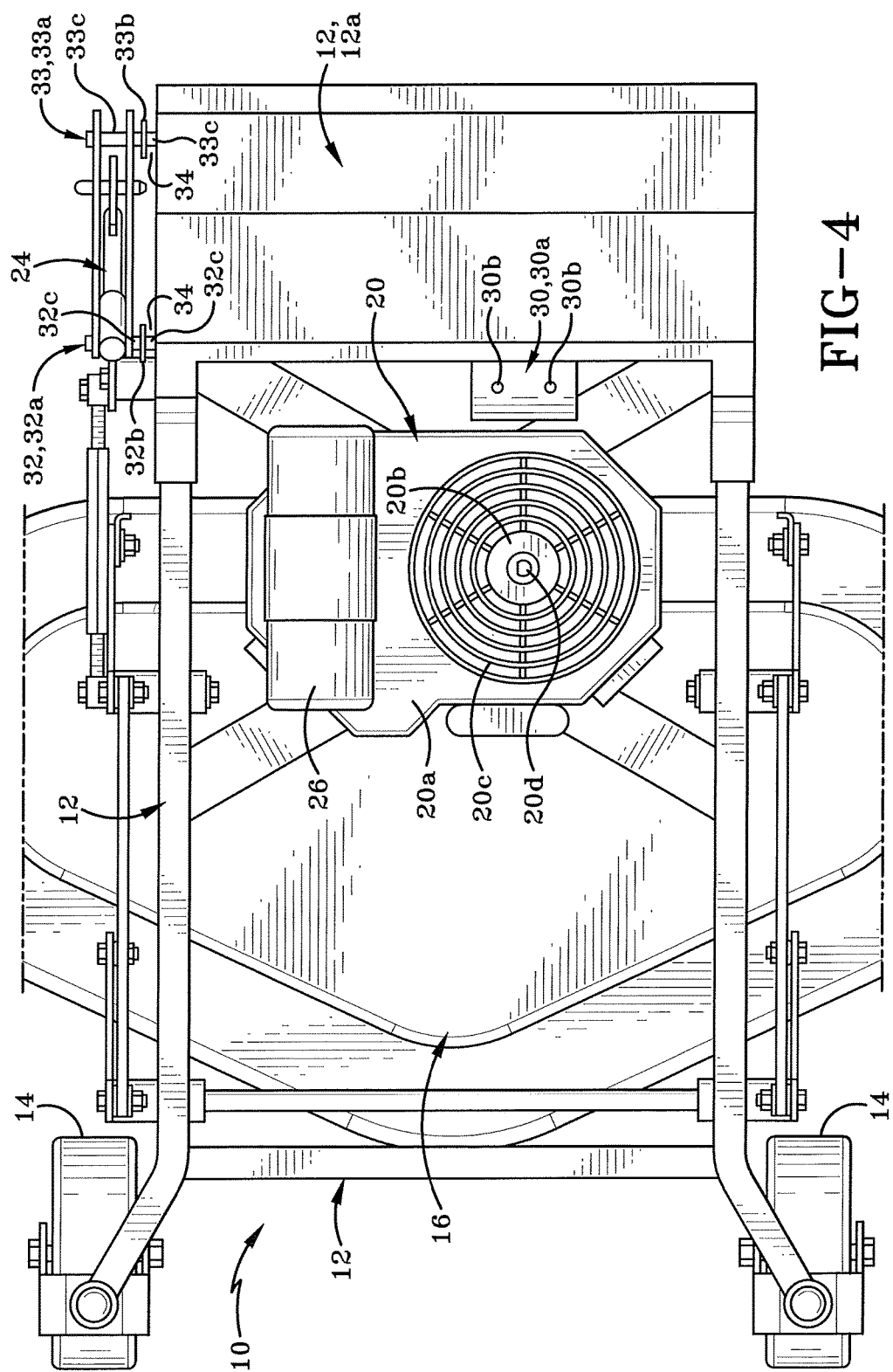
FIG. 4 is a partial top view of the stand-on mower (as illustrated in FIG. 3) with the portable hydraulic system removed therefrom.

Mower 10 may be provided with a number of mounting components that are useful for mounting hydraulic system 28 to mower 10. As shown in FIGS. 4 and 13, a mounting bracket 30 may be provided on a front wall of a vertically extending portion 12a of frame 12 that also supports control assembly 22. Mounting bracket 30 comprises a generally horizontally-oriented mounting plate 30a that extends outwardly from the front wall of portion 12a of frame 12; generally being located midway and centrally along the front wall of portion 12a. Mounting bracket 30 further includes a pair of spaced apart pins 30b (FIG. 4) which extends vertically upwardly from plate 30a.

Figure 5:
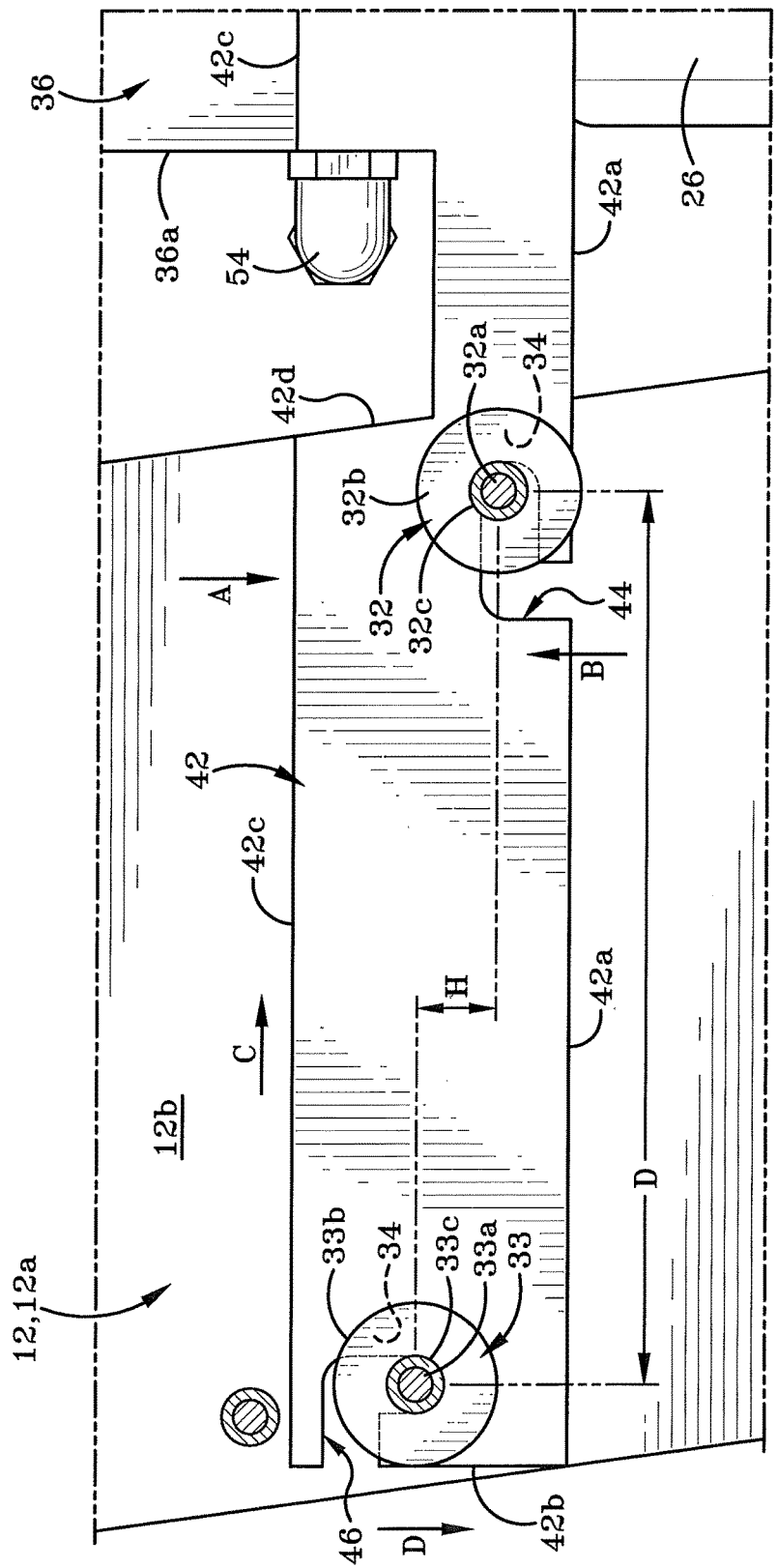
FIG. 5 is a right side view of the mounting plate used to secure the portable hydraulic system to part of the frame of the mower; with the right side view taken along line 5-5 of FIG. 3.

Additional mounting components for hydraulic system 28 are provided in the form of a first mounting pin 32 (FIGS. 4 & 5) and a second mounting pin 33 that extend from a side wall 12b of portion 12a of frame 12. Mounting pins 32, 33 may generally be at about the same height as mounting bracket 30 on portion 12a. Each mounting pin 32, 33 comprises a shaft 32a, 33a, a washer 32b, 33b and a spacer 32c, 33c, respectively. Each shaft 32a, 33a extends outwardly from the side wall of portion 12a and may be oriented generally horizontally. As best seen in FIG. 5, the shafts 32a, 33a of the two mounting pins 32, 33 may be spaced a distance "D" laterally apart from each other. Shafts 32a, 33a may also be vertically offset relative to each other by a height "H". As illustrated in FIG. 5, shaft 33a is located a distance vertically above shaft 32a. The spacer 32c, 33c on each mounting pin 32, 33 may be positioned around the respective shaft 32a, 33a and may be located adjacent the side wall of portion 12a of frame 12. Washer 32b is engaged around shaft 32a and washer 33b is engaged around shaft 33a. Washers 32b, 33b are maintained a distance away from the side wall of portion 12a by spacers 32c, 33c, respectively. A gap 34 (FIG. 4) is defined between each washer 32b, 33b and the wall of portion 12a. The purpose of gaps 34 will be discussed later herein.

Engine 20 is encased in a housing 20a that includes an upper wall with an annular ring 20b (FIG. 4) located centrally in a vent region 20c. Ring 20b defines central hole through which a D-shaped bore 20d in engine 20 is accessible. D-shaped bore 20d extends downwardly into engine (as illustrated in FIG. 1) and is configured to receive a complementary-shaped shaft from hydraulic system 28 as will be later described herein. A lower portion of hydraulic system 28 will be seated on the upper wall of housing 20a when the shaft extending outwardly from hydraulic system 28 is received in bore 20d. The upper wall of housing 20a forms part of the mounting platform for hydraulic system 28.

Referring now to FIGS. 6-11, hydraulic system 28 will be described in greater detail. Hydraulic system 28 includes a reservoir 36, a pump 38, and an oil filter located within a filter housing 40 and is operatively positioned between reservoir 36 and pump 38 Reservoir 36 and/or pump 38 may be fabricated from aluminum as this metal allows for good heat dissipation and assists in making hydraulic system 28 relatively light for the output it provides.

Reservoir 36 may be of any desired size which permits hydraulic system 28 to be portable. It has been found that a reservoir 36 that is able to hold around 3 quarts of oil is suitable for provision as part of hydraulic system 28. Any type of oil may be utilized in hydraulic system 28 including but not limited to synthetic hydraulic oil.

Pump 38 may be a variable displacement pump that is able to output 14 GPM and 3500 PSI, making available variable flows for many high demand applications. It will be understood that the pump selected may be capable of outputting a high or a low hydraulic fluid flow rate. It will be understood, however, that any desired suitable pump which delivers other capacities may be utilized as part of hydraulic system 28 instead of the variable displacement pump 38 illustrated in these figures. Pump 38 will be described further later herein.

Hydraulic system 28 includes at least a first mounting assembly and a second mounting assembly. The first mounting assembly may take the form of a mounting plate 42 that is provided to engage pins 32, 33 on frame 12. Mounting plate 42 may be welded along a wall of reservoir 36, particularly as illustrated a side wall of reservoir 36; and extend outwardly for a distance beyond a rear wall 36a (FIG. 5) thereof. Mounting plate 42 has a bottom surface 42a, an end surface 42b, and a top surface 42c. Top surface 42c defines a notched area 42d (FIG. 10) therein. Mounting plate 42 is used to mount portable hydraulic system 28 to frame 12 and to that end the mounting plate 42 and frame 12 are provided with a locking mechanism in the form of pins and complementary slots. As illustrated in the attached figures the slots are defined in the mounting plate 42 and the pins are provided on the frame 12. Referring to FIG. 5, mounting plate 42 defines two spaced-apart L-shaped slots 44, 46 therein (FIGS. 10 and 11) that are oriented at right angles to each other. First slot 44 originates in a mouth in bottom surface 42a of plate 42, extends for a distance vertically upwardly, turns through 90°, and extends horizontally and forwardly toward rear wall 36a of reservoir 36. Second slot 46 originates in a mouth in end surface 42b of plate 42, extends horizontally for a distance and toward rear wall 36a of reservoir 36, turns through 90° and extends downwardly toward bottom surface 42a for a distance.

When hydraulic system 28 is to be engaged with mower 10, mounting plate 42 is positioned to extend along side wall 12b of portion 12a of frame 12. Mounting plate 42 is positioned so that first mounting pin 32 extending outwardly from side wall 12b is positioned at the mouth of first slot 44 and second mounting pin 33 is positioned at the mouth of second slot 46. Hydraulic system 28 is lowered in the direction of arrow "A" (FIG. 5) so that first mounting pin 32 moves along first slot 44 in the direction of arrow "B". Hydraulic system 28 is then moved in the direction of arrow "C" and this movement slides mounting plate 42 in the direction of arrow "C" thereby moving mounting plate 42 and therefore first and second slots 44, 46 relative to first and second pins 32, 33 in the direction of arrow "C". Hydraulic system 28 is then lowered in the direction of arrow "D" and this motion locks first and second mounting pins 32, 33 in the positions illustrated in FIG. 5. At this point, the reservoir 36 of hydraulic system 28 will be engaged with mower 10.

It will be understood that instead of pins 32, 33 being provided on side wall 12b of portion 12a of frame 12 and the slots 44, 46 being provided on mounting plate 42; the pins may be provided on mounting plate 42 and the slots may be defined in complementary regions of the side wall of portion 12a. The pins on mounting plate 42 would be oriented to be received in the complementary slots in side wall 12b.

Figure 8:
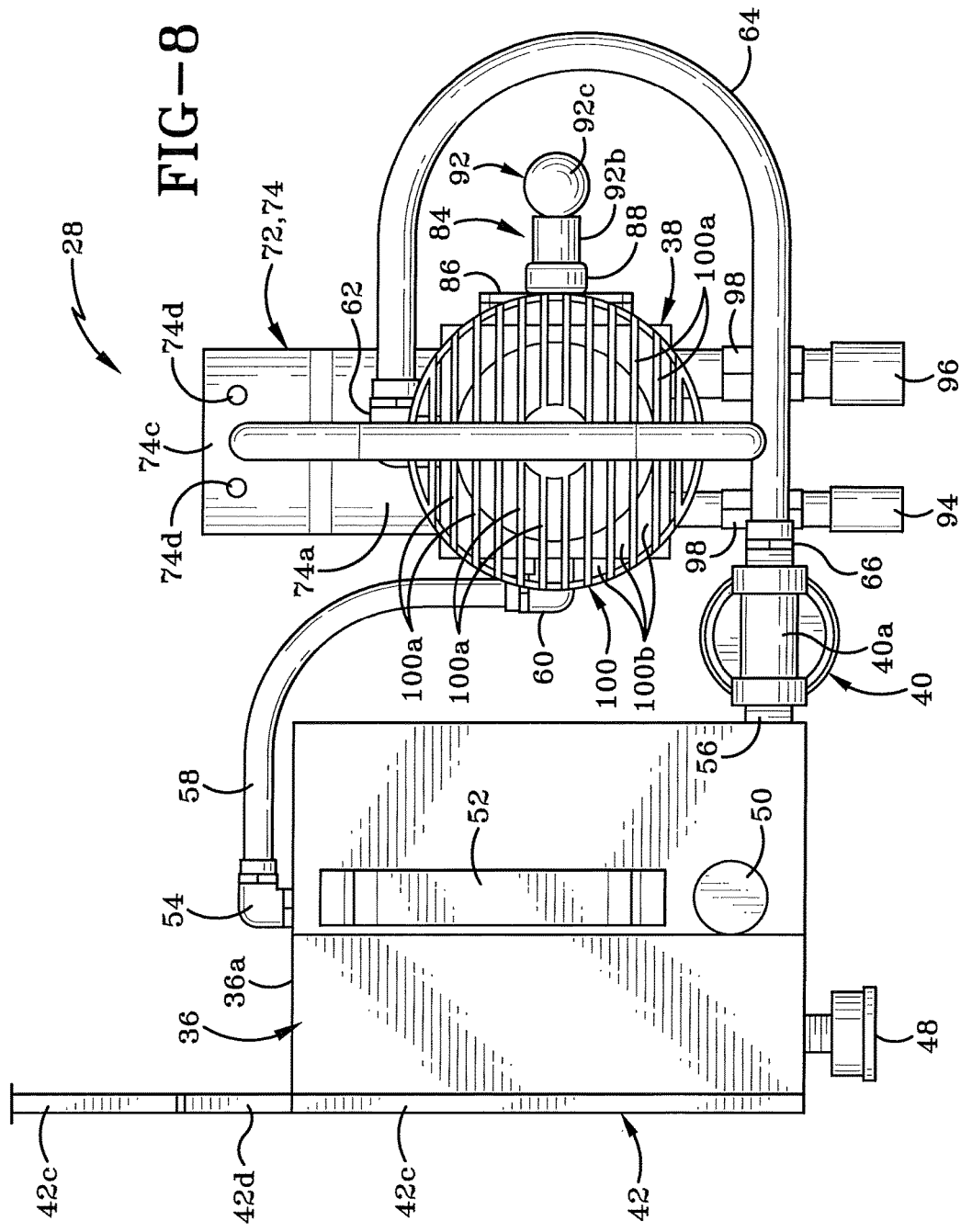
FIG. 8 is a top view thereof.
Figure 12:
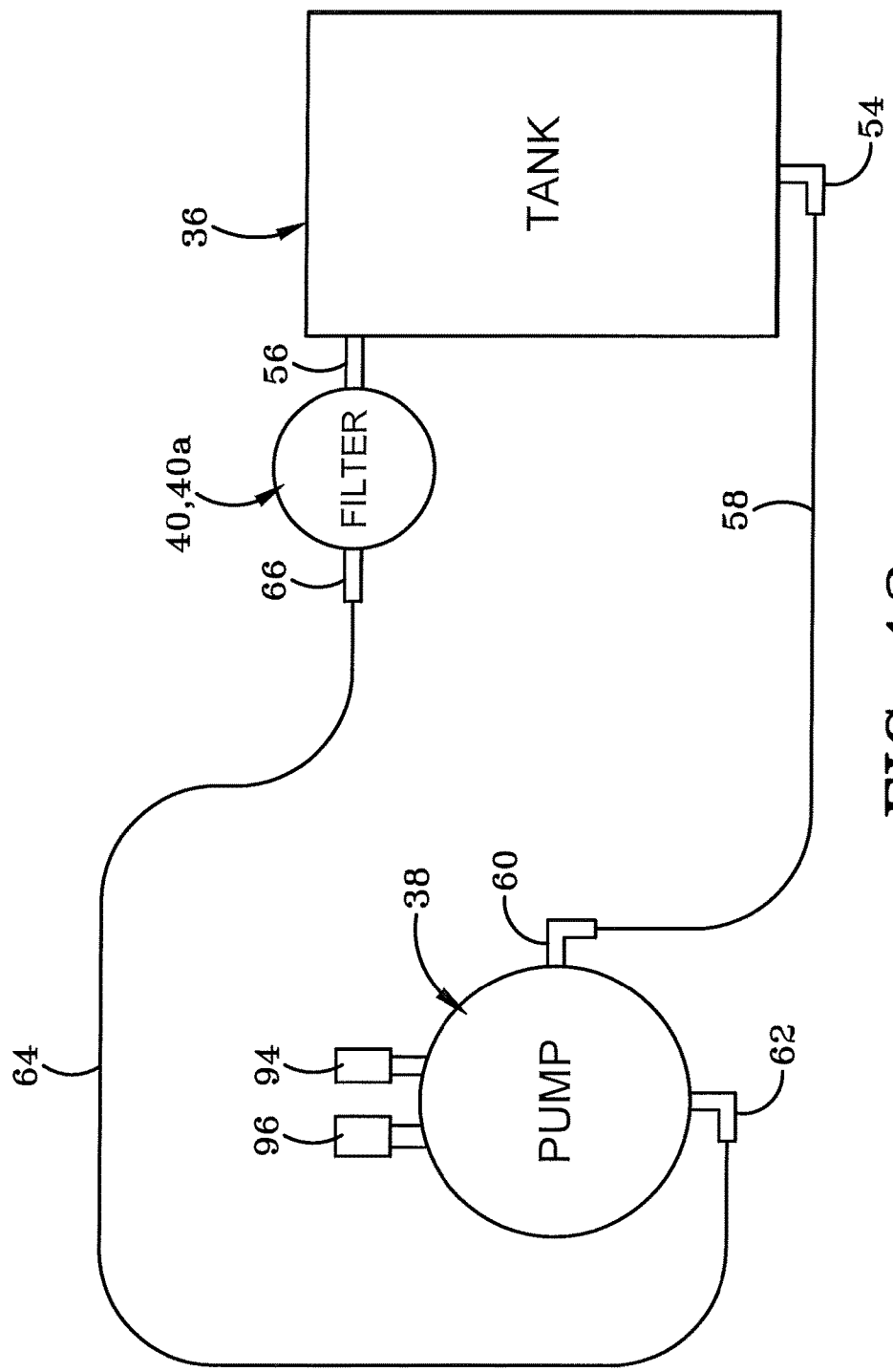
FIG. 12 is a flow chart of the portable hydraulic system of FIG. 6.

Reservoir 36 also includes a thermometer assembly 48, a vent pipe 50, and a first handle 52. As best seen in FIGS. 8 and 12, an adapter 54 and a nipple pipe 56 are engaged with reservoir 36. A first end of a first hydraulic hose 58 is connected to reservoir 36 by adapter 54. A second end of first hydraulic hose 58 is engaged with pump 38 by way of another adapter 60. An adapter 62 connects a first end of a second hydraulic hose 64 to pump 38; and a second end of hose 64 is secured to filter housing 40 by another adapter 66. Nipple pipe 56 connects reservoir and filter housing 40 together. As illustrated in FIG. 12, a closed hydraulic loop is formed by the aforementioned components Hydraulic fluid flows through this closed loop.

Figure 6:
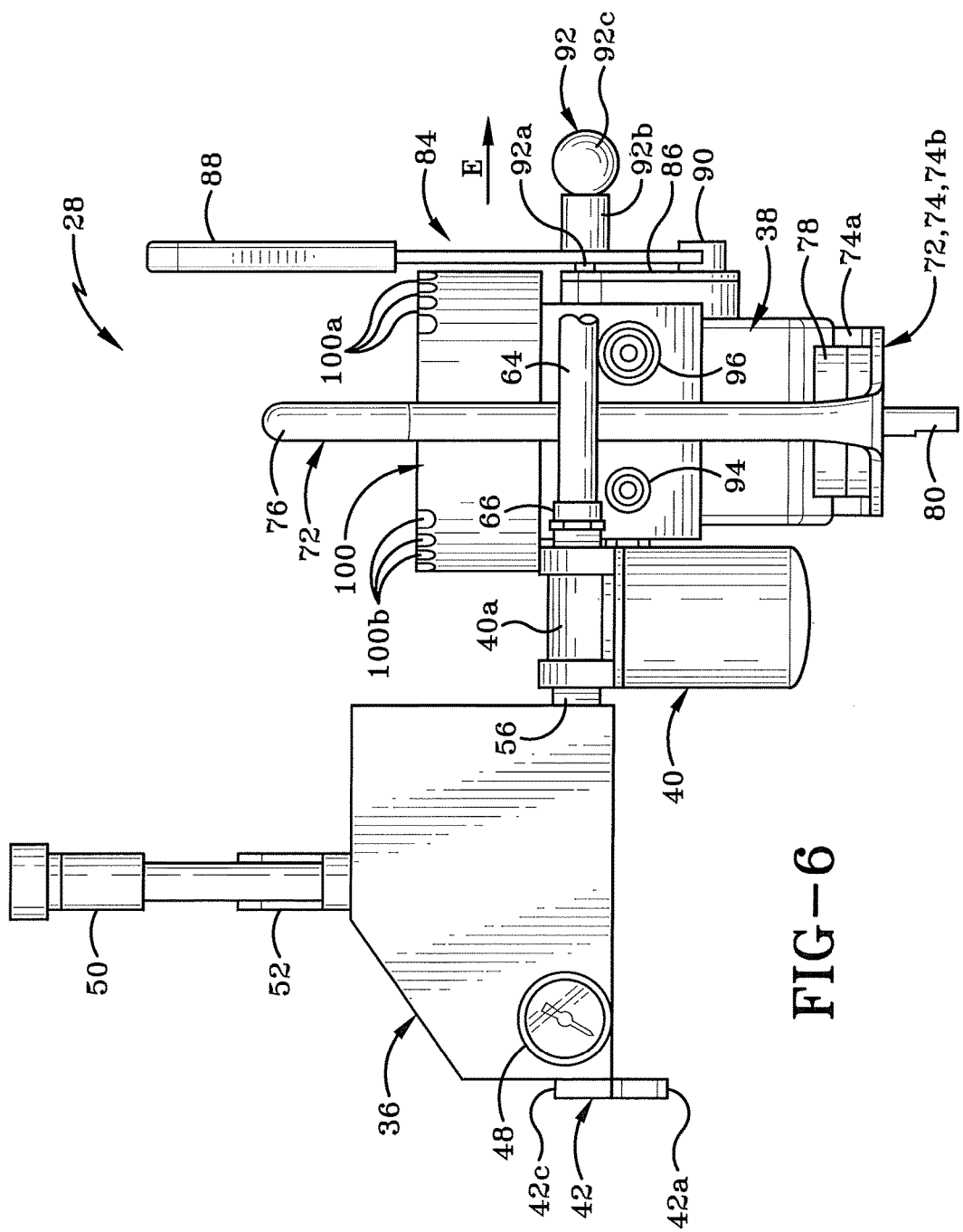
FIG. 6 is a front view of the portable hydraulic system shown alone and detached from the mower.
Figure 7:
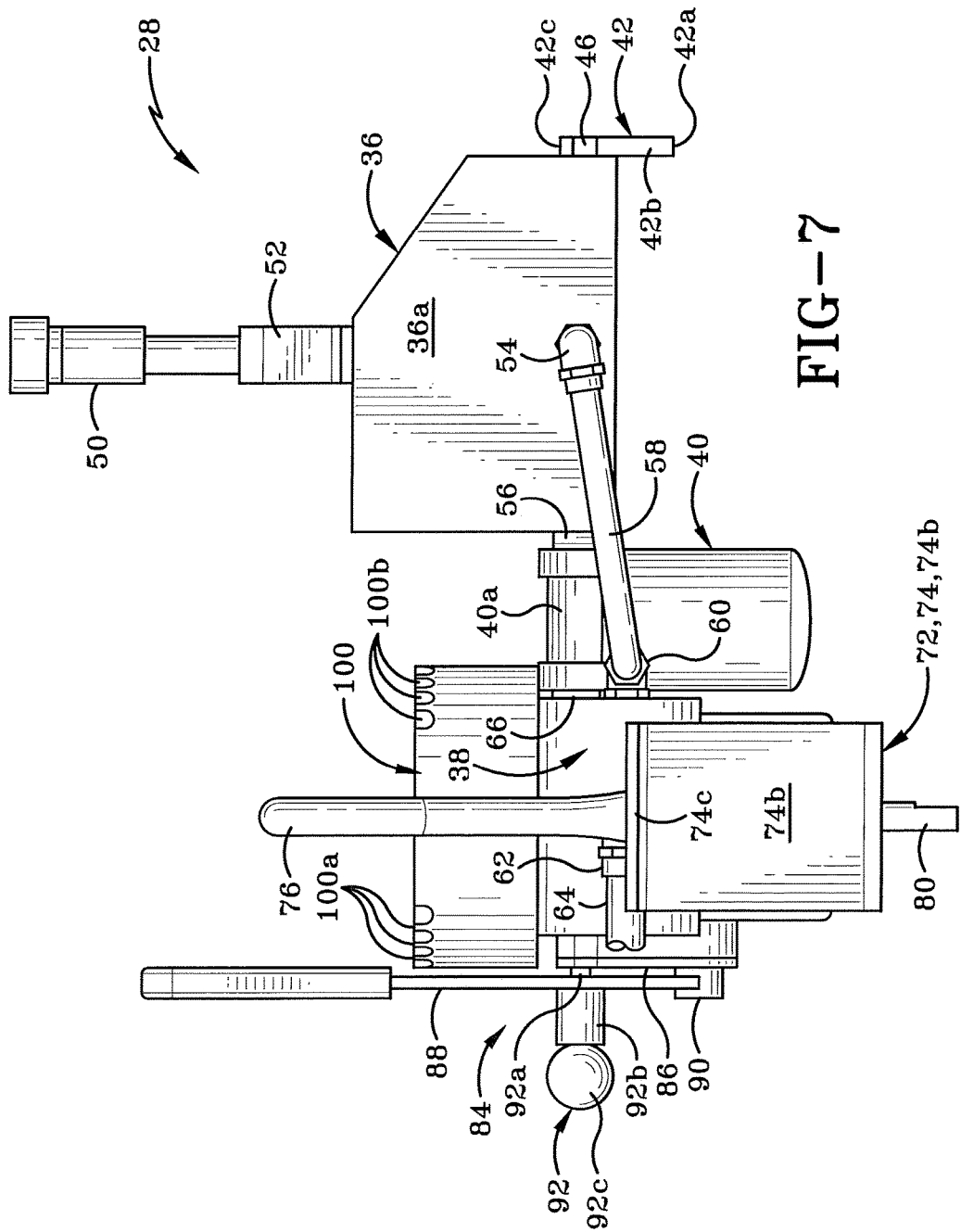
FIG. 7 is a rear view of thereof.
Figure 9:
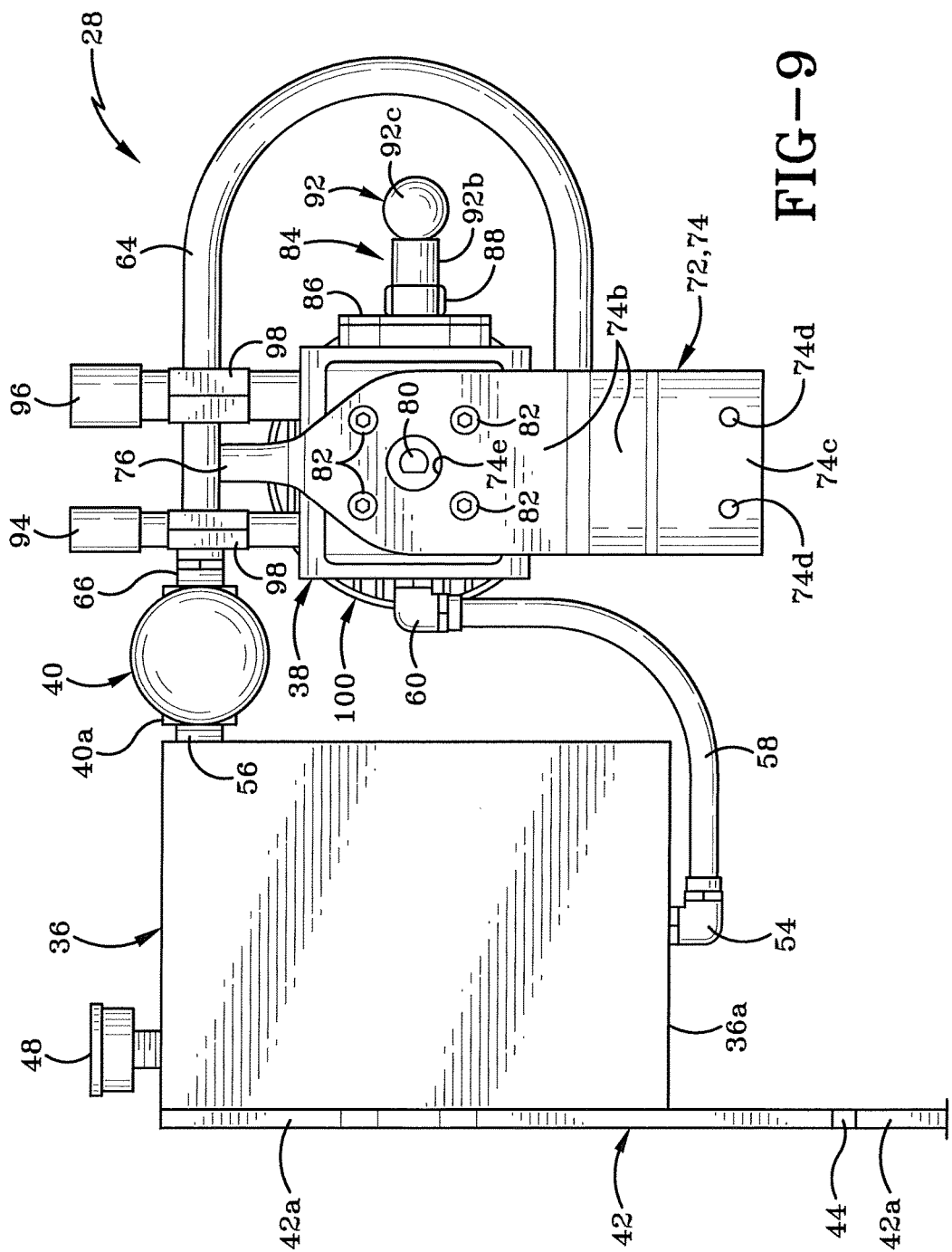
FIG. 9 is a bottom view thereof.
Figure 10:
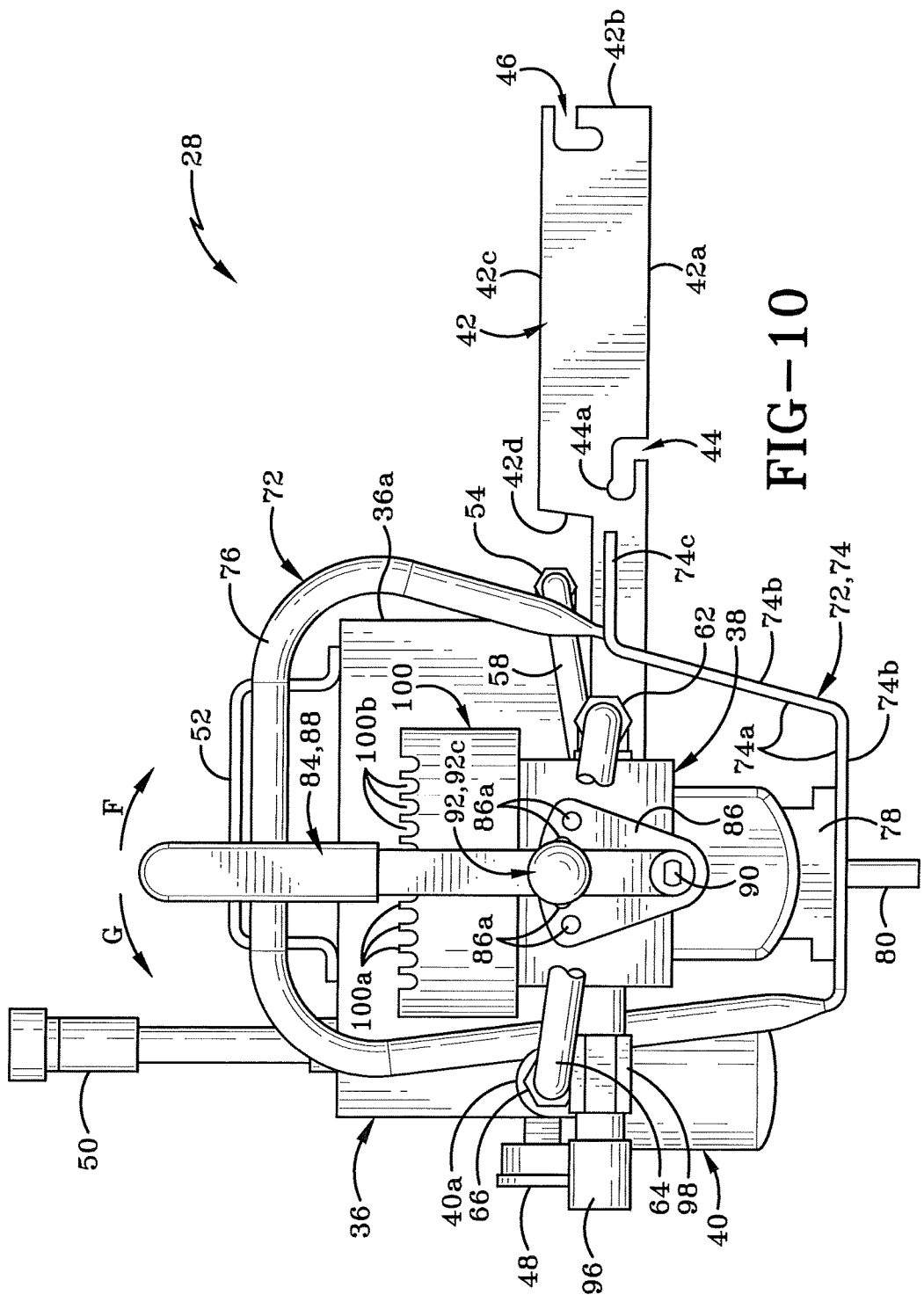
FIG. 10 is a left side view thereof.
Figure 11:
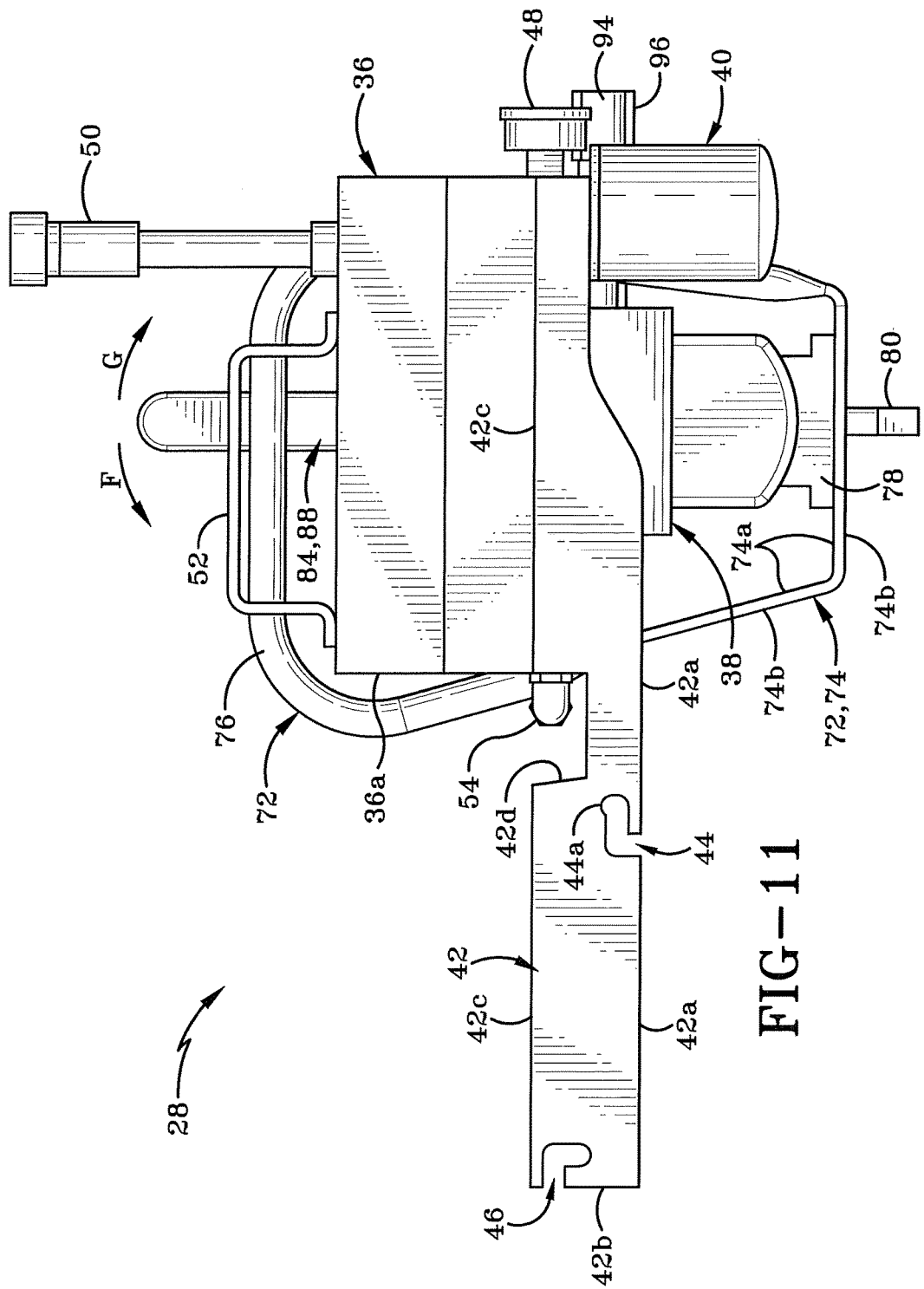
FIG. 11 is a right side view thereof.

Referring to FIGS. 6 and 9, hydraulic system 28 also includes a base assembly 72 is engaged with pump 38 and which engages mounting bracket 30 and engine 20 of mower 10. Base assembly 72 includes a base plate 74 and a tubular member 76 that are integral with each other. Base plate 74 is a generally planar member that is of a generally open S-shape when viewed from the side, as is illustrated in FIG. 10. Base plate 74 has a first surface 74a, a second surface 74b and an extension 74c. Extension 74c may comprise the second mounting assembly on hydraulic system 28 and be positioned to engage mounting plate 30 on frame 12. A mounting 78 for pump 38 is provided on a horizontally extending portion of first surface 74a. The horizontally extending portion of base plate 74 defines a hole 74e (FIG. 9) therein. An input shaft 80 extending outwardly from pump 38 extends through an aligned aperture in mounting 78 and through hole 74e. Shaft 80 extends for a distance below second surface 74b of base plate 74 and is configured to be complementary to bore 20d defined in engine 20. Consequently, since bore 20d is D-shaped in cross-section (FIG. 4), shaft 80 is also D-shaped in cross-section (FIG. 9) and is of a complementary size to bore 20d. The configuration of shaft 80 and bore 20d makes it possible to engage hydraulic system 28 to engine 20 in only one orientation. (It will be understood that instead of shaft 80 extending outwardly from pump 38, shaft 80 may be provided on engine 20 and extend upwardly into a shaft-receiving recess defined in pump 38.) Shaft 80 includes a torque arm mount to prevent rotation of shaft 80 within bore 20d. Bore 20d is a female couple for shaft 80 to operatively engage pump 38 to engine 20. When pump 38 is activated, shaft 80 will be rotated by engine 20 and be driven thereby and shaft 80 in turn drives pump 38.

FIG. 9 also shows that base plate 74 is secured to mounting 78 by way of fasteners 82. Part of base plate 74 angles upwardly from the horizontally-oriented portion that receives shaft 80 therethrough and terminates in the horizontally oriented extension 74c (FIG. 10). Extension 74c may be located substantially coplanar with mounting plate 42 and be laterally spaced therefrom. Extension 74c defines two holes 74d (FIG. 8) therein that are spaced-apart and sized to receive pins 30b of mounting plate 30 on portion 12a of frame 12 therethrough. When the pump 38/base plate 74 are engaged with mower 10 the shaft 80 is inserted into bore 20d and extension 74c is positioned over mounting bracket 30 so that pins 30b align with holes 74d. Pump 38/base plate 74 are then lowered so that pins 30b slide into holes 74d. The overall weight of hydraulic system 28 keeps extension 74c seated on mounting bracket 30. If desired, however, some additional type of fastener may be engaged with pins 30b to keep pump 38, base plate 74 from disengaging from mounting bracket 30.

It will be understood that the pins may, instead, be provided on extension 74c and the holes may be provided in the mounting plate 30*a*. Furthermore, extension 74*c* and mounting plate 30*a* may be oriented so that the pins pass through the holes to secure the extension 74*d* and plate 30*a* together. The pins and holes together form a locking assembly for selectively securing portable hydraulic system 28 to mower 10.

In summary, when hydraulic system 28 is engaged with mower 10, mounting plate 42 is engaged with pins 32, 33, shaft 80 is engaged in bore 20*d* and extension 74*c* is engaged with mounting plate 30. Hydraulic system 10 may be engaged with mower in about thirty seconds. Disengaging hydraulic system 28 from mower 10 requires reversal of the steps described for engaging hydraulic system therewith. The disengaging process also takes around thirty seconds to start to finish.

Tubular member 76 is integrally formed with base plate 74 and extends outwardly from one end of base plate 74, is bent generally into a U-shaped and is welded or otherwise secured back onto a region of base plate 74. Tubular member 76 may be welded back onto the angled portion of base plate 74 or onto an inward part of extension 74*c*. Tubular member 76 may be used as a second handle on hydraulic system 28 for manipulating and maneuvering the pump 38 and base plate 74 portion of the system 28.

Hydraulic system 28 may also be provided with a control assembly 84 (FIG. 10) that is operatively engaged with pump 38 and is used to adjust and control the flow of hydraulic fluid through hydraulic system 28. Control assembly 84 is activated to adjust and control the flow speed and the direction of flow of the hydraulic fluid in system 28 in either of a forward direction or a reverse direction. Control assembly 84 includes an adjustment plate 86 mounted on pump 38 and an adjustment lever 88 that is readily accessible to an operator of mower 10. Lever 88 is engaged with adjustment plate 86 by way of a pivot 90. Adjustment plate 86 defines a plurality of spaced-apart apertures 86*a* therein that are arranged along a curve. Control assembly 84 also includes an adjustment pin 92 having a shaft 92*a* and a coil spring positioned around the shaft 92*a* and located within a housing 92*b*. Shaft 92*a* is sized to be received through any selected one of the apertures 86*a* in plate 86. When shaft 92*a* is retracted (by pulling head 92*c* in the direction of arrow "E") so that shaft 92*a* does not extend through any of the apertures 86*a*), then lever 88 may be pivoted about pivot 90 and rotated in the direction of arrow "F" or in the direction of arrow "G". Lever 88 is pivoted until shaft 92*a* aligns with any selected one of the apertures 86*a* which relates to the flow speed and direction desired by the operator. Handle member 92*c* is then released and, under pressure from the spring located within housing 92*b*, shaft 92*a* moves in the opposite direction to arrow "E" and engages in the newly selected aperture 86*a*, thereby locking lever 88 in the newly selected position and locking in the desired flow characteristics for pump 38.

Hydraulic system 28 may also include a first coupling port 94 and a second coupling port 96 that are provided directly on pump 38. First coupling port 94 may be a male coupling port and second coupling portion 96 may be a female coupling port. First and second coupling ports 94, 96 allow for a first end of two hydraulic hoses (not shown) to be detachably connected to hydraulic system 28. The second ends of these hoses may then be connected to any components that require hydraulic flow to operate. For example, a snowplow blade may be mounted on a front end of frame 12 of mower 10 and be operatively engaged with the portable hydraulic system 28 via the hoses and coupling ports 94, 95. These hydraulic hoses will then allow hydraulic fluid to flow from pump 38 to hydraulic actuators on the snowplow blade and back to pump 38 so that the snowplow blade may be lifted, lowered and angled as required. Both of the first and second coupling ports 94, 96 may be of a closed-face quick-connect type that allows hydraulic hoses to be quickly and easily engaged therewith and disengaged therefrom. Adapters 98 may be used to secure first and second coupling ports 94, 96 to pump 38. The sizes of the adapters 98 selected are based on the relative sizes of the first and second coupling ports 94, 96 with which the specific adapter 98 is to be engaged.

A cooling assembly 100 is also engaged with pump 38 to dissipate heat generated during operation of pump 38. Cooling assembly 100 includes a housing having a plurality of ribs 100*a* and openings 100*b* defined in an upper surface thereof. Air is able to flow through openings 100*b* in cooling assembly 100 and thereby transfer heat away from pump 38.

Hydraulic system 28 is configured so as not to move any oil flow (or very little oil flow) unless and until the lever 88/pump 38 is stroked. Consequently, hydraulic system 28 does not draw horsepower from engine 20 unless and until there is a demand to do so. This arrangement allows for normal operation of the mower 10 when the hydraulic system 28 is not used or when hydraulic system 28 is disengaged from mower 10.

It will be understood that while hydraulic system 28 has been described as being used on a mower 10 or other type of utility vehicle, hydraulic system 28 could be used in a wide range of other vehicles or even in different applications such as being secured to a variety of power tools that require hydraulic power.

It should be noted that while hydraulic system 28 is illustrated as having a substantially vertical shaft 80 extending outwardly therefrom and is designed to be engaged with an engine that has a vertical drive shaft, system 28 may be modified to include a substantially horizontal shaft extending outwardly therefrom. This latter configuration is used when hydraulic system is to be engaged with an engine having a horizontally oriented drive shaft. Additionally, hydraulic system 28 may be able to be modified to be engaged in different drive locations besides the top of an engine or crankshaft opening.

Furthermore, pump 38 as described herein could be a fixed flow pump or a pump having any of a range of different capacities and outputs; and system 28 could be used for applications such as power steering on other vehicle types as well as in a wide range of auxiliary uses.

Hydraulic system 28 could also include an actuator (such as a 12V actuator) to stroke the pump/flow in either of the forward or reverse directions, providing full features of the system 28 if the operator did not have direct access to the pump 38 or lever 88.

Still further, additional auxiliary pumps could be mounted directly on top of pump 38 and this could provide a secondary hydraulic system (fixed or variable displacement), and provide higher or lower hydraulic fluid flow and sharing common make-up oil.

Furthermore, an additional capacity reservoir in addition to reservoir 38 may be incorporated in system 28. An oil cooling feature may also be included in hydraulic system 28.

A method of operating an attachment "S" on a utility vehicle (mower 10) may comprise the steps of providing a portable hydraulic system 28; mounting portable hydraulic system 28 on utility vehicle 10; engaging portable hydraulic system 28 with an engine 20 on the utility vehicle 10; connecting hydraulic hoses "T" (FIG. 3) between portable hydraulic system 28 and attachment "S"; the portable hydraulic system 28 to provide hydraulic fluid via hydraulic hoses "T" to attachment "S".

The method may further comprise the steps of engaging a control assembly 84 on portable hydraulic system 28 to adjust a rate of flow of hydraulic fluid through hydraulic system 28 and/or hydraulic hoses "T" or to adjust a direction of flow of the hydraulic fluid therethrough. The method may also comprise passing the hydraulic fluid through an oil filter 40 provided on portable hydraulic system 28. Portable hydraulic system 28 is mountable on utility vehicle 10 in around thirty seconds; and wherein portable hydraulic system 28 is disengageable from utility vehicle 10 in about thirty seconds. The mounting of portable hydraulic system 28 to utility vehicle 10 or disengagement therefrom may be accomplished without the use of any additional tools such as screwdrivers, wrenches etc.

The method may further include providing a portable hydraulic system that includes a reservoir 36, pump 38, oil filter 40 and various hoses that link the reservoir 36, pump 38 and oil filter 40 together to form a closed loop through which hydraulic fluid from reservoir 36 may be caused to flow by pump 38. The method may include engaging pump 38 with an engine 20 on utility vehicle 10 via an input shaft 80 and providing power to pump 38 from engine 20 in order to actuate pump 38. Pump 38 may then be used to pump a quantity of hydraulic fluid from reservoir 36 and through a first hydraulic hose "T" quick connect engaged to one of ports 94 or 96 on pump 38; delivering the quantity of hydraulic fluid to attachment "S", and pumping the quantity of hydraulic fluid back to pump 38 through a second hydraulic hose "T" quick connected to the other of the ports 94 or 96 on pump 38.

The method may further include disengaging mounting assemblies 42, 74c, and input shaft 80 from their engagement with cooperating components (32, 33; 30b, 20d) on utility vehicle 10; grasping handles 84, 76 on portable hydraulic system 28 and lifting system 28 off of utility vehicle 10. The method may further include carrying system 28 by handles 84, 76 and positioning system 28 on another supporting unit such as a second utility vehicle and then engaging portable hydraulic system 28 with that other supporting unit (i.e. the second utility vehicle) and then connecting hydraulic hoses (like hoses "T") to ports 94, 96 on pump 38 and then securing the other ends of those hydraulic hoses to a second attachment provided on the second utility vehicle and then actuating system 28 to control that second attachment.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the invention is not limited to the exact details shown or described.

The invention claimed is:

1. A portable hydraulic system for selective engagement with a piece of equipment requiring hydraulic fluid flow; said portable hydraulic system comprising:
    a portable reservoir defining an interior cavity adapted to store a quantity of hydraulic fluid therein;
    a pump operatively engaged with the reservoir;
    a mounting assembly provided on the reservoir or the pump; said mounting assembly being adapted to selectively mount the portable hydraulic system to a supporting unit or selectively dismount the portable hydraulic system from the supporting unit; and wherein the pump is adapted to be operatively engaged with the piece of equipment and when so engaged, the pump selectively delivers a quantity of the hydraulic fluid from the reservoir to the piece of equipment.

2. The portable hydraulic system as defined in claim 1, wherein the mounting assembly comprises a first mounting assembly provided on the reservoir; wherein the first mounting assembly comprises a mounting plate extending outwardly from a wall of the reservoir and a locking mechanism adapted to selectively engage the mounting plate on the supporting unit.

3. The portable hydraulic system as defined in claim 1, wherein the mounting assembly comprises a second mounting assembly provided on the pump; and wherein the second mounting assembly includes a base plate provided on the pump and a locking mechanism; wherein the locking mechanism is adapted to secure the base plate to a mounting bracket provided on the supporting unit.

4. The portable hydraulic system as defined in claim 1, wherein the pump includes one of an input shaft or an input shaft receiving recess with which the pump is adapted to be operatively engaged with an engine of the supporting unit and to be driven thereby.

5. The portable hydraulic system as defined in claim 1, further comprising a control assembly operatively engaged with the pump and being operable to control a rate of flow of hydraulic fluid from the reservoir and through the pump or a direction of flow of hydraulic fluid.

6. The portable hydraulic system as defined in claim 1, further comprising an oil filter operatively engaged with the reservoir and the pump.

7. The portable hydraulic system as defined in claim 1, further comprising a vent pipe and a thermometer assembly provided on the reservoir.

8. The portable hydraulic system as defined in claim 1, wherein the portable hydraulic system weighs around twenty-three pounds.

9. The portable hydraulic system as defined in claim 1, wherein the reservoir is sized to hold about 3 quarts of oil therein.

10. The portable hydraulic system as defined in claim 1, further comprising a handle provided on one of the reservoir or the pump; wherein the handle is adapted to be utilized to lift, carry or move the portable hydraulic system from a first location to a second location.

11. The portable hydraulic system as defined in claim 10, further comprising a second handle provided on the other of the reservoir or the pump.

12. In combination,
    a utility vehicle, an attachment engaged with the utility vehicle, and a portable hydraulic system; wherein the portable hydraulic system is selectively mountable on the utility vehicle; wherein said portable hydraulic system is selectively fluidly engaged with the attachment; and wherein the attachment is selectively operated via the portable hydraulic system when the portable hydraulic system is engaged with the utility vehicle.

13. The combination as defined in claim 12, wherein the utility vehicle includes a utility vehicle hydraulic system that is permanently installed in the utility vehicle; and wherein the portable hydraulic system is independent of the utility vehicle hydraulic system.

14. The combination as defined in claim 12, wherein the utility vehicle is a zero-turn stand-on or sit-on mower.

15. The combination as defined in claim 12; wherein the portable hydraulic system includes a pump and the pump is selectively operatively engaged with an engine of the utility vehicle; and the portable hydraulic system is driven by the utility vehicle's engine.

16. A method of operating an attachment on a utility vehicle;
said method comprising the steps of:
provrding a portable hydraulic system;
providing a utility vehicle and an attachment engaged with the utility vehicle;
temporarily mounting the portable hydraulic system on the utility vehicle;
engaging the portable hydraulic system with an engine on the utility vehicle;
connecting hydraulic hoses between the portable hydraulic system and the attachment; and
actuating the portable hydraulic system to provide hydraulic fluid via the hydraulic hoses to the attachment.

17. The method as defined in claim 16, further comprising the step of engaging a control assembly on the portable hydraulic system to adjust a rate of flow of hydraulic fluid through the hydraulic hoses or to adjust a direction of flow of the hydraulic fluid through the hydraulic hoses.

18. The method as defined in claim 16, further comprising the step of passing the hydraulic fluid through an oil filter provided on the portable hydraulic system.

19. The method as defined in claim 16, wherein the portable hydraulic system is mountable on the utility vehicle in around thirty seconds; and wherein the portable hydraulic system is disengageable from the utility vehicle in about thirty seconds.

20. The method as defined in claim 16, wherein the portable hydraulic system is mounted onto or dismounted from the utility vehicle without the use of tools.

21. The method as defined in claim 16, wherein the portable hydraulic system is manipulated or carried by way of a handle provided thereon.

* * * * *